US010576442B1

(12) United States Patent
Chyou et al.

(10) Patent No.: US 10,576,442 B1
(45) Date of Patent: Mar. 3, 2020

(54) CHEMICAL LOOPING REACTOR WITH SHARED PARTIAL REACTOR VESSELS

(71) Applicant: Institute of Nuclear Energy Research, Atomic Energy Council, Executive Yuan, R.O.C., Taoyuan (TW)

(72) Inventors: Yau-Pin Chyou, Taoyuan (TW); Po-Chuang Chen, Taoyuan (TW); Keng-Tung Wu, Taichung (TW); Rei-Yu Chein, Taichung (TW)

(73) Assignee: INSTITUTE OF NUCLEAR ENERGY RESEARCH, ATOMIC ENERGY COUNCIL, Taoyuan (TW)

( * ) Notice: Subject to any disclaimer, the term of this patent is extended or adjusted under 35 U.S.C. 154(b) by 0 days.

(21) Appl. No.: 16/561,166

(22) Filed: Sep. 5, 2019

(51) Int. Cl.
*B01J 8/34* (2006.01)
*C01B 3/36* (2006.01)
*B01J 8/26* (2006.01)
*B01J 8/18* (2006.01)
*C01B 32/50* (2017.01)

(52) U.S. Cl.
CPC ........... *B01J 8/1863* (2013.01); *B01J 8/1827* (2013.01); *B01J 8/26* (2013.01); *B01J 8/34* (2013.01); *C01B 3/36* (2013.01); *C01B 32/50* (2017.08); *B01J 2208/00752* (2013.01); *B01J 2208/00761* (2013.01); *C01B 2203/0255* (2013.01)

(58) Field of Classification Search
CPC ..... B01J 8/1863; B01J 8/34; B01J 8/26; B01J 8/1827; B01J 2208/00761; B01J 2208/00752; C01B 32/50; C01B 3/36; C01B 2203/0255

USPC ......................................................... 422/141
See application file for complete search history.

(56) References Cited

U.S. PATENT DOCUMENTS

| | | | |
|---|---|---|---|
| 9,890,949 B2* | 2/2018 | Chyou | F23C 10/005 |
| 2015/0241056 A1* | 8/2015 | Bollas | F23C 99/006 431/7 |
| 2016/0166973 A1* | 6/2016 | Chyou | B01J 8/34 423/220 |

* cited by examiner

*Primary Examiner* — Huy Tram Nguyen
(74) *Attorney, Agent, or Firm* — Jackson IPG PLLC; Demian K. Jackson

(57) ABSTRACT

A chemical looping reactor is provided. The reactor comprises a first reduction reactor, a second reduction reactor and a shared oxidation reactor. The shared oxidation reactor is set between the first and second reduction reactors. Therein, the present invention applies interconnected fluidized beds in chemical looping combustion. Single redox is processed with oxygen carrier (oxide of metal like nickel or copper). The first and second reduction reactors individually handle their own reactions and reactants. Thus, in a chemical looping reactor, two different source materials can be handled at the same time. The oxygen carrier can be cycled separately as well for fully releasing oxygen contained within. High-purity carbon dioxide is further obtained. The application can be extended to hydrogen generation. Hence, the present invention simplifies the reaction mechanism, enhances the yield, improves the operation efficiency and reduces the cost.

6 Claims, 2 Drawing Sheets

US 10,576,442 B1

CHEMICAL LOOPING REACTOR WITH SHARED PARTIAL REACTOR VESSELS

TECHNICAL FIELD OF THE INVENTION

The present invention relates to a chemical looping reactor with shared partial reactor vessels; more particularly, to apply interconnected fluidized beds in chemical looping combustion, where the interconnected fluidized beds are used in the chemical looping combustion to form a reaction zone containing of two fluidized beds of the same function to be integrated and set in a whole structure.

DESCRIPTION OF THE RELATED ARTS

The most common chemical loop reactors have two categories, comprising fluidized bed reactors (FBR) and moving bed reactors (MBR). The conventional fluidized bed reactor has beds occupying large areas. Although the newly invented interconnected fluidized beds (IFB) have already been applied in chemical looping like what is revealed in U.S. Pat. No. 9,903,584, only one source material can be handled at a time. If two source materials were to be handled, two reactors of the same type might be required. For example, if there were two different source materials, they may not be suitable to be handled in the same reactor for their burning times, temperatures or other substances contained inside may affect each other. When two different source materials are to be handled simultaneously, a prior art provides a reactor having a structure to be divided into 4 plus 4 as 8 reaction mechanisms. Consequently, the land occupation is big and the utility cost is increased. The prior arts cannot solve the problem on handling two different source materials simultaneously.

Currently, technical requirements of carbon reduction, waste recycling and the circular economy have great market potentials with reduction targets being set and green energy ratio being actively increased. Yet, as shown in the above techniques, although the current international development of energy-saving and carbon-reducing technologies are a few together with related fluidized-bed chemical looping technologies, related applications and ideas are not found to be the same as the present invention in the sub-field of interconnected fluidized beds. Hence, the prior arts do not fulfill all users' requests on actual use.

SUMMARY OF THE INVENTION

The main purpose of the present invention is to apply interconnected fluidized beds in chemical looping combustion to process single redox with oxygen carriers (oxides of metal like nickel or copper), where first and second reduction reactors separately handle their own reactions and reactants so that, in a chemical looping reactor, two different material sources can be handled at the same time; the oxygen carriers can cycle separately to fully release oxygen contained within for further obtaining high-purity $CO_2$; the application of the present invention can be extended to hydrogen generation; and the present invention simplifies the reaction mechanism, enhances the yield, improves the operation efficiency and reduces the cost.

To achieve the above purposes, the present invention is a chemical looping reactor with shared partial reactor vessels, using interconnected fluidized beds in chemical looping combustion to form a reaction zone consisting of two fluidized beds of the same function to be integrated and set in a whole structure and comprising a first reduction reactor, a second reduction reactor and a shared oxidation reactor, where the first reduction reactor comprises a first lean bed and a first dense bed; a first weir egress is located on top of a side of the first lean bed; and a first orifice is disposed on at bottom of a side of the first dense bed to connect to the first lean bed; the second reduction reactor comprises a second lean bed and a second dense bed; a second weir egress is located on top of a side of the second lean bed; and a second orifice is disposed on at bottom of a side of the second dense bed to connect to the second lean bed; the shared oxidation reactor is located between and communicated with the first and second reduction reactors; the shared oxidation reactor comprises a third lean bed and a third dense bed; a third orifice is disposed on at bottom of a side of the third dense bed to connect to the third lean bed; the third dense bed communicates with the first and second lean beds through the first and second weir egresses at upper ends of two sides of the third dense bed, separately; and the third lean bed communicates with the first and second dense beds through third weir egresses at upper ends of two sides of the third dense bed, separately. Accordingly, a novel chemical looping reactor with shared partial reactor vessels is obtained.

BRIEF DESCRIPTION OF THE DRAWINGS

The present invention will be better understood from the following detailed description of the preferred embodiment according to the present invention, taken in conjunction with the accompanying drawings, in which.

DESCRIPTION OF THE PREFERRED EMBODIMENT

The following description of the preferred embodiment is provided to understand the features and the structures of the present invention.

Figure 1:
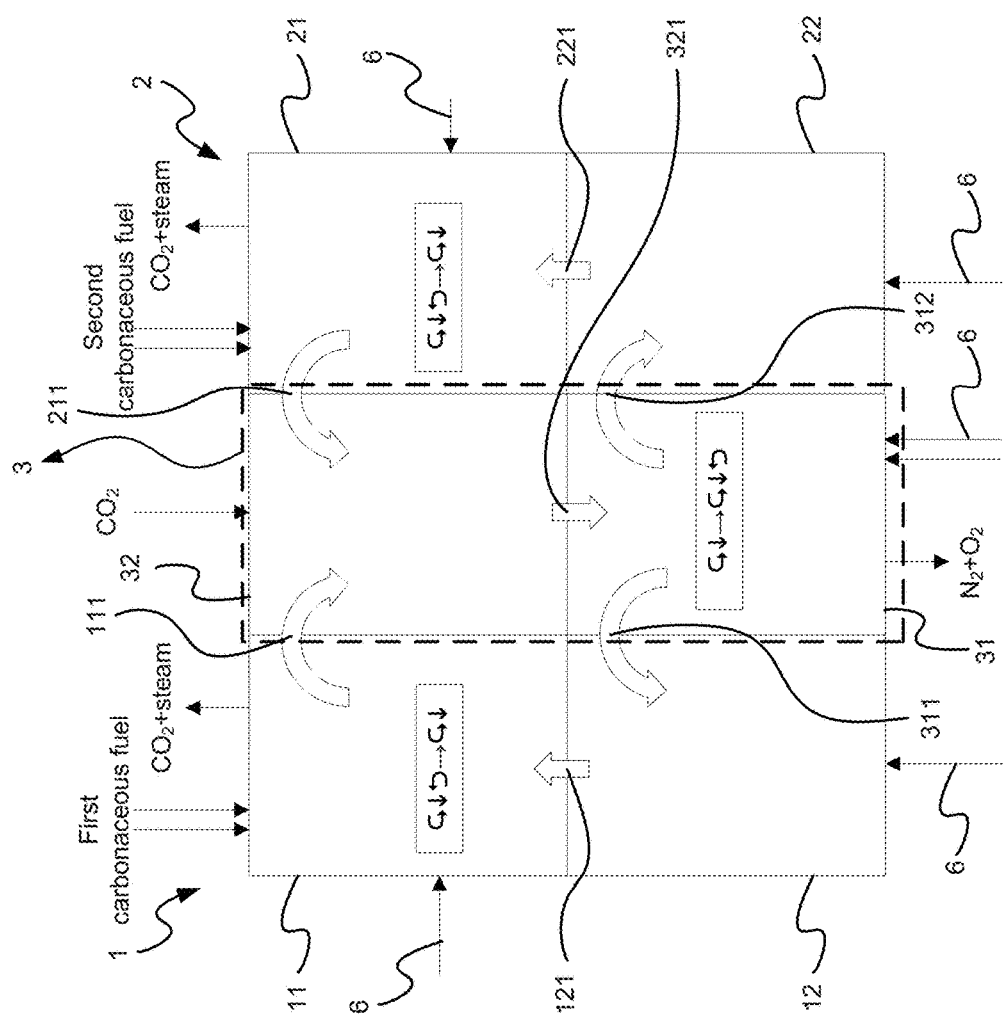
FIG. 1 is the view showing the internal structure of the preferred embodiment according to the present invention.
Figure 2:
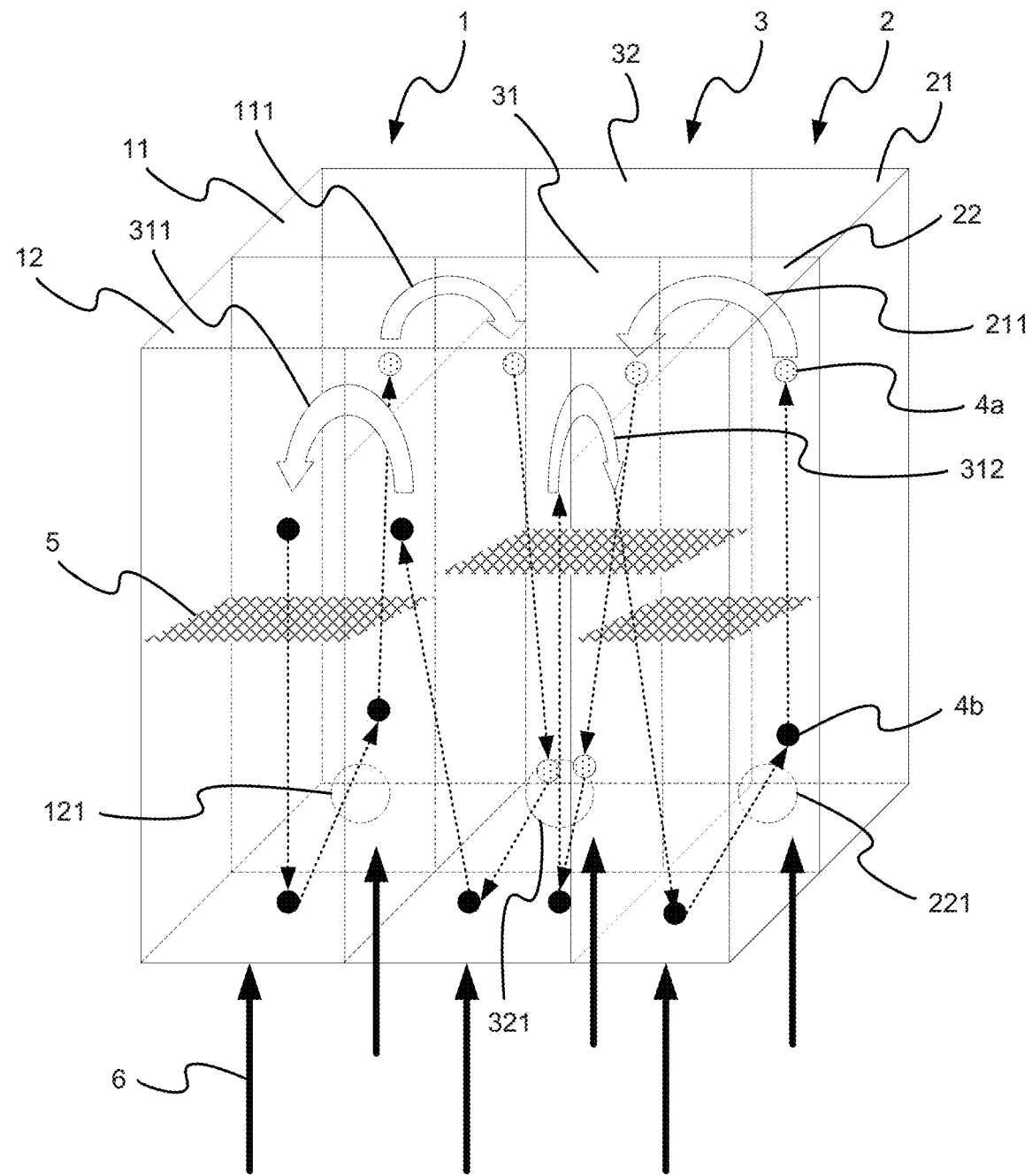
FIG. 2 is the 3-dimensional (3D) view showing the flows of the oxygen carriers.

Please refer to FIG. 1 and FIG. 2, which are a view showing the internal structure of a preferred embodiment according to the present invention; and a 3D view showing the flows of oxygen carriers. As shown in the figures, the present invention is a chemical looping reactor with shared partial reactor vessels, comprising a first reduction reactor 1, a second reduction reactor 2 and a shared oxidation reactor 3, where the shared oxidation reactor 3 is set between the first and second reduction reactors 1,2.

The first reduction reactor 1 comprises a first lean bed 11 and a first dense bed 12. A first weir egress 111 is set on top of a side of the first lean bed 11. A first orifice 121 is set on at bottom of a side of the first dense bed 12 to connect to the first lean bed 11. The first reduction reactor 1 contains a first oxidized-state oxygen carrier. A fluidizing gas is injected into the first dense bed 12 as a conveying gas to deliver the first oxidized-state oxygen carrier from the first dense bed 12 to enter the first lean bed 11 through the first orifice 121. A first carbonaceous fuel and a fluidizing gas 6 (such as carbon dioxide ($CO_2$), steam or air) are injected into the first lean bed 11 to process reduction with the first oxidized-state oxygen carrier and the first carbonaceous fuel to generate a first metallic-state oxygen carrier and a gas consisting of $CO_2$ and water vapor. The first metallic-state oxygen carrier in the first lean bed 11 is carried by the fluidizing gas 6 to flow up across the first weir egress 111 to enter the shared oxidation reactor 3.

The second reduction reactor 2 comprises a second lean bed 21 and a second dense bed 22. A second weir egress 211 is set on top of a side of the second lean bed 21. A second orifice 221 is set on at bottom of a side of the second dense bed 22 to connect to the second lean bed 21. The second reduction reactor 2 contains a second oxidized-state oxygen carrier. A fluidizing gas is injected into the second dense bed 22 as a conveying gas to deliver the second oxidized-state oxygen carrier from the second dense bed 22 to enter the second lean bed 21 through the second orifice 221. A second carbonaceous fuel and a fluidizing gas 6 (such as $CO_2$, steam or air) are inputted into the second lean bed 21 to process reduction with the second oxidized-state oxygen carrier and the second carbonaceous fuel to generate a second metallic-state oxygen carrier and a gas consisting of $CO_2$ and water vapor. The second metallic-state oxygen carrier in the second lean bed 21 is carried by the fluidizing gas 6 to flow up across the second weir egress 211 to enter the shared oxidation reactor 3.

The shared oxidation reactor 3 communicates with the first and second reduction reactors, comprising a third lean bed 31 and a third dense bed 32. A third orifice 321 is set on at bottom of a side of the third dense bed 32 to connect to the third lean bed 31. The third dense bed 32 communicates with the first and second lean beds 11,21 through the first and second weir egresses 111, 211 on top of two sides of the third dense bed 32, separately. The third lean bed 31 communicates with the first and second dense beds 12,22 through third weir egresses 311 on top of two sides of the third dense bed 31, separately. The first and second metallic-state oxygen carriers flow across the first and second weir egresses 111,211 to enter the third dense bed 32 to be accumulated, respectively. $CO_2$ is injected into the third dense bed 32 as a conveying gas to deliver the first and second metallic-state oxygen carriers from the third dense bed 32 to enter the third lean bed 31 through the third orifice 321. A fluidizing gas 6 is injected into the third lean bed 31 to process oxidation with oxygen and the first and second metallic-state oxygen carriers to generate the first and second oxidized-state oxygen carriers and a gas consisting of nitrogen ($N_2$) and oxygen ($O_2$). The first and second oxidized-state oxygen carriers in the third lean bed 31 are carried by the fluidizing gas to flow up across the third weir egresses 311,312 to enter the first and second dense beds 12,22 to form looping cycles, respectively. Hence, the first and second oxidized-state oxygen carriers are provided to the first and second reduction reactors 1,2 again, respectively, to form the looping cycles of oxidation and reduction processed repeatedly. Thus, a novel chemical looping reactor with shared partial reactor vessels is obtained.

The chemical looping reactor according to the present invention is connected with at least one feeding module (not shown in the figure) to be fed with the first and second carbonaceous fuels which are of the same or different.

The chemical looping reactor according to the present invention uses oxygen carriers for single-stage (-step) redox. Each of the oxygen carriers can be nickel, copper or other metallic oxide for single reaction, whose singularity is different from that of the three-stage iron oxidation, e.g. nickel used in FIG. 1 and FIG. 2. On using, the present invention shares two areas with beds converting metallic nickel into nickel oxide to form the shared oxidation reactor 3 set in the middle of the chemical looping reactor. Then, the first and second reduction reactors 1,2 are set at two sides.

The beds of the same function in the 8 beds of the reaction zones of the original reaction mechanism are integrated in the middle; that is, two intermediate beds are shared in the middle of the whole structure. When two source materials are processed simultaneously, the first and second reduction reactors 1, 2 handle corresponding reactions with their own source materials, separately, and their oxygen carriers cycles separately to fully release the oxygen contained within for further obtaining high-purity $CO_2$. The application can be extended to hydrogen generation. Hence, the present invention simplifies the reaction mechanism, enhances the yield, improves the operation efficiency and reduces the cost. As shown in FIG. 2, the carbonaceous fuels shown in FIG. 1 is omitted here to mainly demonstrate the flows and reactions of the oxygen carriers. The stack bed height 5 shows that the oxygen carriers will be accumulated to a certain height in the dense beds, which not only increase the driving forces toward the lean beds but also isolate gases from entering the dense beds. The fluidizing gas ($CO_2$, steam or air) injected into the apparatus and air are all referred to as the fluidizing gas 6. In FIG. 2, the metallic-state oxygen carrier 4a enters the third lean bed 31, which is an oxidation zone as well, through the third opening 321 at bottom of the third dense bed 32 of the shared oxidation reactor 3; and is carried by the fluidizing gas 6 to flow up in the third lean bed 31 during oxidation to process reaction with oxygen in the fluidizing gas 6 to generate the oxidized-state oxygen carrier 4b. After being conveyed to the third weir egresses 311,312 on top, the oxidized-state oxygen carrier 4b passes through the third weir egresses 311,312 to be accumulated in the first and second reduction reactor 1,2 and, then, passes through the first and second orifices 121,221 of the first and second dense beds 12,22 to enter the first and second lean beds 11,21, respectively. The oxidized-state oxygen carriers are reacted with the first and second carbonaceous fuels in the first and second lean beds 11,21. The oxygen in the oxidized-state oxygen carriers is dispossessed for the first and second carbonaceous fuels to process burning by the oxygen thus obtained. Because the reaction only relates the returning of oxygen atoms, no nitrogen involves. In another word, the gases generated are high-purity $CO_2$ and water vapor, where the high-purity $CO_2$ can be easily obtained through proper separation. Thus, the oxygen carriers obtain looping cycles in the reactors to process oxidation and reduction repeatedly.

The chemical looping reactor according to the present invention has the following benefits:

1. When two source materials are processed simultaneously, two operating sets of fluidized beds, which process oxidation and reduction (i.e. oxygen-rich combustion and carbon capture), can be simplified. The 8 beds of the original reaction mechanism has 2 beds shared to be set as a shared oxidation reactor in the middle of the whole structure and, then, reduction reactors are set at two sides, separately. The original 8 reaction mechanisms are reduced by sharing the two beds in the same area where metallic state is turned into oxidized state. Thus, the two different source materials are processed simultaneously to greatly reduce land occupation and utility cost.

2. Interconnected fluidized beds are applied in chemical looping combustion for processing single redox with oxygen carriers (oxides of metal like nickel or copper). The first and second reduction reactors handle corresponding reactions with their own source materials, separately. Thus, in a chemical looping reactor, two different material sources can be handled at the same time. The oxygen carriers can also cycle separately to fully release the oxygen contained within for further obtaining high-purity $CO_2$. The application can be extended to hydrogen generation. Hence, the reaction mechanism is simplified, the yield is enhanced, the operation efficiency is improved and the cost is reduced.

To sum up, the present invention is a chemical looping reactor with shared partial reactor vessels, where interconnected fluidized beds are applied in chemical looping combustion to process single redox with oxygen carriers (oxides of metal like nickel or copper); first and second reduction reactors separately handle their own reactions and reactants so that, in a chemical looping reactor, two different material sources can be handled at the same time; the oxygen carriers can be cycled separately for fully releasing oxygen contained within to further obtain high-purity $CO_2$; the application of the present invention can be extended to hydrogen generation; and the present invention simplifies the reaction mechanism, enhances the yield, improves the operation efficiency and reduces the cost.

The preferred embodiment herein disclosed is not intended to unnecessarily limit the scope of the invention. Therefore, simple modifications or variations belonging to the equivalent of the scope of the claims and the instructions disclosed herein for a patent are all within the scope of the present invention.

What is claimed is:

1. A chemical looping reactor with shared partial reactor vessels, obtaining interconnected fluidized beds in chemical looping combustion to obtain a reaction zone consisting of two fluidized beds of the same function to be integrated and set in a whole structure and comprising
   a first reduction reactor,
      wherein said first reduction reactor comprises a first lean bed and a first dense bed; a first weir egress is located at an upper end of a side of said first lean bed; and a first orifice is disposed on at a lower end of a side of said first dense bed to connect to said first lean bed;
   a second reduction reactor,
      wherein said second reduction reactor comprises a second lean bed and a second dense bed; a second weir egress is located at an upper end of a side of said second lean bed; and a second orifice is disposed on at a lower end of a side of said second dense bed to connect to said second lean bed; and
   a shared oxidation reactor,
      wherein said shared oxidation reactor is located between and communicated with said first and second reduction reactors; said shared oxidation reactor comprises a third lean bed and a third dense bed; a third orifice is disposed on at a lower end of a side of said third dense bed to connect to said third lean bed; said third dense bed communicates with said first and second lean beds through said first and second weir egresses at upper ends of two sides of said third dense bed, separately; and said third lean bed communicates with said first and second dense beds through third weir egresses at upper ends of two sides of said third dense bed, separately.

2. The chemical looping reactor according to claim 1,
   wherein said first reduction reactor has a first oxidized-state oxygen carrier; a fluidizing gas is inputted into said first dense bed as a conveying gas to convey said first oxidized-state oxygen carrier from said first dense bed to enter said first lean bed through said first orifice; a first carbonaceous fuel and a fluidizing gas are inputted into said first lean bed to process reduction with said oxidized-state oxygen carrier and said first carbonaceous fuel to generate a first metallic-state oxygen carrier and a gas consisting of carbon dioxide ($CO_2$) and water vapor, said first metallic-state oxygen carrier in said first lean bed is carried by said fluidizing gas to flow up across said first weir egress;
   wherein said second reduction reactor has a second oxidized-state oxygen carrier; a fluidizing gas is inputted into said second dense bed as a conveying gas to convey said second oxidized-state oxygen carrier from said second dense bed to enter said second lean bed through said second orifice; a second carbonaceous fuel and a fluidizing gas are inputted into said second lean bed to process reduction with said second oxidized-state oxygen carrier and said second carbonaceous fuel to obtain a second metallic-state oxygen carrier and a gas consisting of $CO_2$ and water vapor; said second metallic-state oxygen carrier in said second lean bed is carried by said fluidizing gas to flow up across said second weir egress; and
   wherein, in said shared oxidation reactor, said first and second metallic-state oxygen carriers flow across said first and second weir egresses to enter said third dense bed to be accumulated, respectively; a fluidizing gas is inputted into said third dense bed as a conveying gas to convey said first and second metallic-state oxygen carriers from said third dense bed to enter said third lean bed through said third orifice; a fluidizing gas is inputted into said third lean bed to process oxidation with said fluidizing gas and said first and second metallic-state oxygen carriers to obtain said first and second oxidized-state oxygen carriers and gases consisting of nitrogen ($N_2$) and oxygen ($O_2$); said first and second oxidized-state oxygen carriers in said third lean bed are carried by said fluidizing gas to flow up across said third weir egresses to enter said first and second dense beds to obtain looping cycles, respectively; and said first and second oxidized-state oxygen carriers are thus provided to said first and second reduction reactors again, respectively, to obtain said looping cycles of oxidation and reduction processed repeatedly.

3. The chemical looping reactor according to claim 2,
   wherein said first and second carbonaceous fuels are selected from a group consisting of the same carbonaceous fuels and different carbonaceous fuels.

4. The chemical looping reactor according to claim 2,
   wherein said first and second oxidized-state oxygen carriers are metallic oxides to process oxidation and reduction.

5. The chemical looping reactor according to claim 4,
   wherein said first and second oxidized-state oxygen carriers are granular powders containing said metallic oxides, separately.

6. The chemical looping reactor according to claim 2,
   wherein said fluidizing gas is selected from a group consisting of $CO_2$, steam and air.

\* \* \* \* \*